United States Patent
Kitsomboonloha et al.

(10) Patent No.: US 9,727,165 B2
(45) Date of Patent: Aug. 8, 2017

(54) DISPLAY WITH DRIVER CIRCUITRY HAVING INTRAFRAME PAUSE CAPABILITIES

(71) Applicant: Apple Inc., Cupertino, CA (US)

(72) Inventors: Rungrot Kitsomboonloha, Cupertino, CA (US); Chun-Yao Huang, Cupertino, CA (US); Shih Chang Chang, Cupertino, CA (US); Szu-Hsien Lee, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 152 days.

(21) Appl. No.: 14/677,531

(22) Filed: Apr. 2, 2015

(65) Prior Publication Data

US 2016/0293081 A1 Oct. 6, 2016

(51) Int. Cl.
*G06F 3/041* (2006.01)
*G09G 3/36* (2006.01)

(52) U.S. Cl.
CPC ........ *G06F 3/0416* (2013.01); *G09G 3/3677* (2013.01); *G09G 2310/0202* (2013.01); *G09G 2310/0218* (2013.01); *G09G 2310/0267* (2013.01); *G09G 2320/043* (2013.01)

(58) Field of Classification Search
CPC ... G09G 3/2003; G06F 3/0414; G06F 3/0421; G06F 3/044; G06F 3/0412; G06F 3/0416
See application file for complete search history.

(56) References Cited

U.S. PATENT DOCUMENTS

| | | | |
|---|---|---|---|
| 6,545,653 B1 | 4/2003 | Takahara et al. | |
| 6,894,673 B2 | 5/2005 | Koga et al. | |
| 7,242,432 B2 | 7/2007 | Watanabe | |
| 7,406,253 B2 | 7/2008 | Ueda et al. | |
| 9,424,793 B2 | 8/2016 | Kitsomboonloha et al. | |
| 9,557,840 B2 | 1/2017 | Lin et al. | |
| 2004/0155851 A1* | 8/2004 | Morii | G09G 3/3659 345/99 |
| 2007/0132700 A1* | 6/2007 | Cho | G09G 3/3677 345/100 |
| 2010/0238156 A1* | 9/2010 | Iwamoto | G09G 3/3648 345/213 |

(Continued)

OTHER PUBLICATIONS

Yamashita et al., U.S. Appl. No. 14/301,121, filed Jun. 10, 2014.

*Primary Examiner* — Ryan A Lubit
(74) *Attorney, Agent, or Firm* — Treyz Law Group, P.C.; G Victor Treyz; Tianyi He (57) ABSTRACT

A display may have an array of pixels controlled by display driver circuitry. Gate driver circuitry supplies gate line signals to rows of the pixels. The gate driver circuitry may include blocks of gate driver circuits each having an output coupled to a respective one of the gate lines. The gate driver circuits of each block are coupled in a chain to form a shift register. Each block has a local block-level gate start pulse generator. The display driver circuitry has a display driver circuit that supplies a gate start pulse clock to each of the local block-level gate start pulse generators. The local block-level gate start pulse generators create gate start pulses that are applied to the first gate driver circuit in each shift register. The display driver circuit may delay the gate start pulse clock when it is desired to implement an intraframe pause.

21 Claims, 7 Drawing Sheets

(56) References Cited

U.S. PATENT DOCUMENTS

| | | | |
|---|---|---|---|
| 2012/0162170 A1* | 6/2012 | Ochiai | G11C 19/287 345/208 |
| 2013/0038583 A1* | 2/2013 | Shimada | G11C 19/28 345/204 |
| 2014/0241488 A1* | 8/2014 | Jang | G11C 19/28 377/64 |
| 2014/0361962 A1 | 12/2014 | Yamashita et al. | |
| 2015/0332632 A1* | 11/2015 | Nakata | G09G 3/2092 345/690 |
| 2015/0356934 A1 | 12/2015 | Yamashita et al. | |
| 2016/0118011 A1 | 4/2016 | Park et al. | |
| 2016/0275852 A1* | 9/2016 | Hong | G09G 3/3696 |

\* cited by examiner

DISPLAY WITH DRIVER CIRCUITRY HAVING INTRAFRAME PAUSE CAPABILITIES

BACKGROUND

This relates generally to electronic devices, and, more particularly, to electronic devices with displays.

Electronic devices such as cellular telephones, computers, and other electronic equipment often contain displays. A display such as a touch screen display includes an array of pixels for displaying images to a user and touch sensor electrodes such as capacitive touch sensor electrodes for gathering touch input from the user. Touch sensor circuitry is used to process touch sensor signals from the touch sensor electrodes. Display driver circuitry such as source line driver circuitry may supply data signals to the array of pixels. Gate line driver circuitry in the display driver circuitry can be used to assert a gate line signal on each row of pixels in the display in sequence to load data into the pixels.

In displays such as touch screen displays, there is a potential for the pixel array to create interference for the touch sensor. The signal-to-noise ratio of the touch sensor can be enhanced by periodically pausing the operation of the display. Pause operations that have the potential to take place in the midst of displaying a frame of data on the display are sometimes referred to as intraframe pause operations.

During an intraframe pause, gate line signals, data signals, and clock signals are held at direct current (DC) levels. This reduces noise and enhances the signal-to-noise ratio for the touch sensor, but has the potential to create undesired voltage stress on certain transistors in the gate line driver circuitry. The gate line driver circuitry includes shift register circuitry that is based on a series of coupled gate line driver stages. The output of each stage is typically used both to drive the gate line associated with that stage and to serve as a carry signal for a subsequent stage. If care is not taken, an output transistor in a paused gate line driver stage will be subjected to a long voltage stress during pausing. This stress is different from the voltage stress experienced by the output transistors in the gate line driver stages that have been turned off. Unequal transistor stresses such as these can result in undesired visible artifacts such as dim lines on a display.

It would therefore be desirable to be able to provide a display such as a touch screen display having display driver circuitry that minimizes or avoids unequal transistor stresses.

SUMMARY

A display may have an array of pixels. Display driver circuitry may supply columns of the pixels with data over data lines. Gate driver circuitry within the display driver circuitry may supply gate signals to rows of the pixels over gate lines.

The gate driver circuitry may include blocks of gate driver circuits each having an output coupled to a respective one of the gate lines. The gate driver circuits of each block are coupled in a chain to form a shift register. Each block has a local block-level gate start pulse generator. The display driver circuitry has a display driver circuit that supplies a gate start pulse clock to each of the local block-level gate start pulse generators.

The local block-level gate start pulse generators create gate start pulses based on the gate start pulse clock. The gate start pulses are applied to the first gate driver circuit in each shift register to initiate operation of the shift register. The display driver circuit may delay the gate start pulse clock when it is desired to implement an intraframe pause.

DETAILED DESCRIPTION

Figure 1:
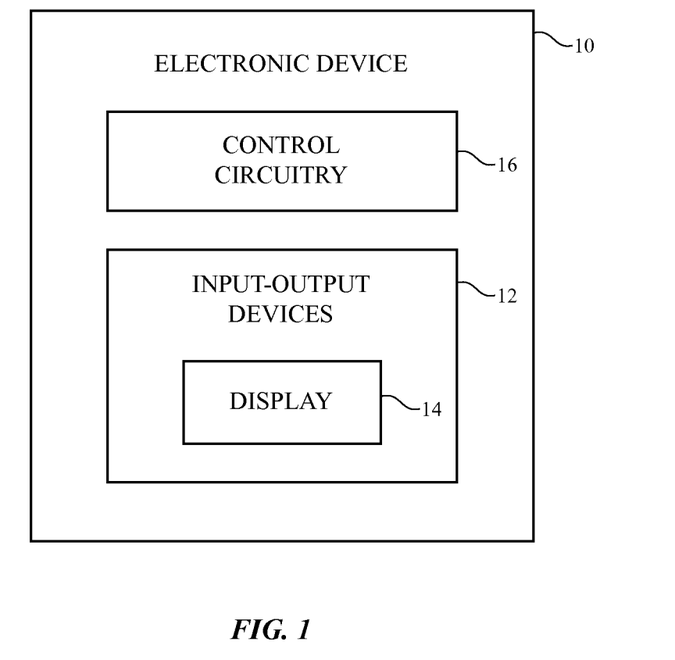
FIG. 1 is a schematic diagram of an illustrative electronic device having a display in accordance with an embodiment.

An illustrative electronic device of the type that may be provided with a display is shown in FIG. 1. As shown in FIG. 1, electronic device 10 may have control circuitry 16. Control circuitry 16 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 16 may be used to control the operation of device 10. The processing circuitry may be based on one or more microprocessors, microcontrollers, digital signal processors, baseband processors, power management units, audio chips, application specific integrated circuits, etc.

Input-output circuitry in device 10 such as input-output devices 12 may be used to allow data to be supplied to device 10 and to allow data to be provided from device 10 to external devices. Input-output devices 12 may include buttons, joysticks, scrolling wheels, touch pads, key pads, keyboards, microphones, speakers, tone generators, vibrators, cameras, sensors, light-emitting diodes and other status indicators, data ports, etc. A user can control the operation of device 10 by supplying commands through input-output devices 12 and may receive status information and other output from device 10 using the output resources of input-output devices 12.

Input-output devices 12 may include one or more displays such as display 14. Display 14 may be a touch screen display that includes a touch sensor for gathering touch input from a user or display 14 may be insensitive to touch. A touch sensor for display 14 may be based on an array of capacitive touch sensor electrodes, acoustic touch sensor structures, resistive touch components, force-based touch sensor structures, a light-based touch sensor, or other suitable touch sensor arrangements.

Control circuitry 16 may be used to run software on device 10 such as operating system code and applications. During operation of device 10, the software running on control circuitry 16 may display images on display 14 using an array of pixels in display 14.

Device 10 may be a tablet computer, laptop computer, a desktop computer, a display, a cellular telephone, a media player, a wristwatch device or other wearable electronic equipment, or other suitable electronic device.

Display 14 may be an organic light-emitting diode display, a liquid crystal display, or a display based on other types of display technology.

Display 14 may have a rectangular shape (i.e., display 14 may have a rectangular footprint and a rectangular peripheral edge that runs around the rectangular footprint) or may have other suitable shapes. Display 14 may be planar or may have a curved profile.

Figure 2:
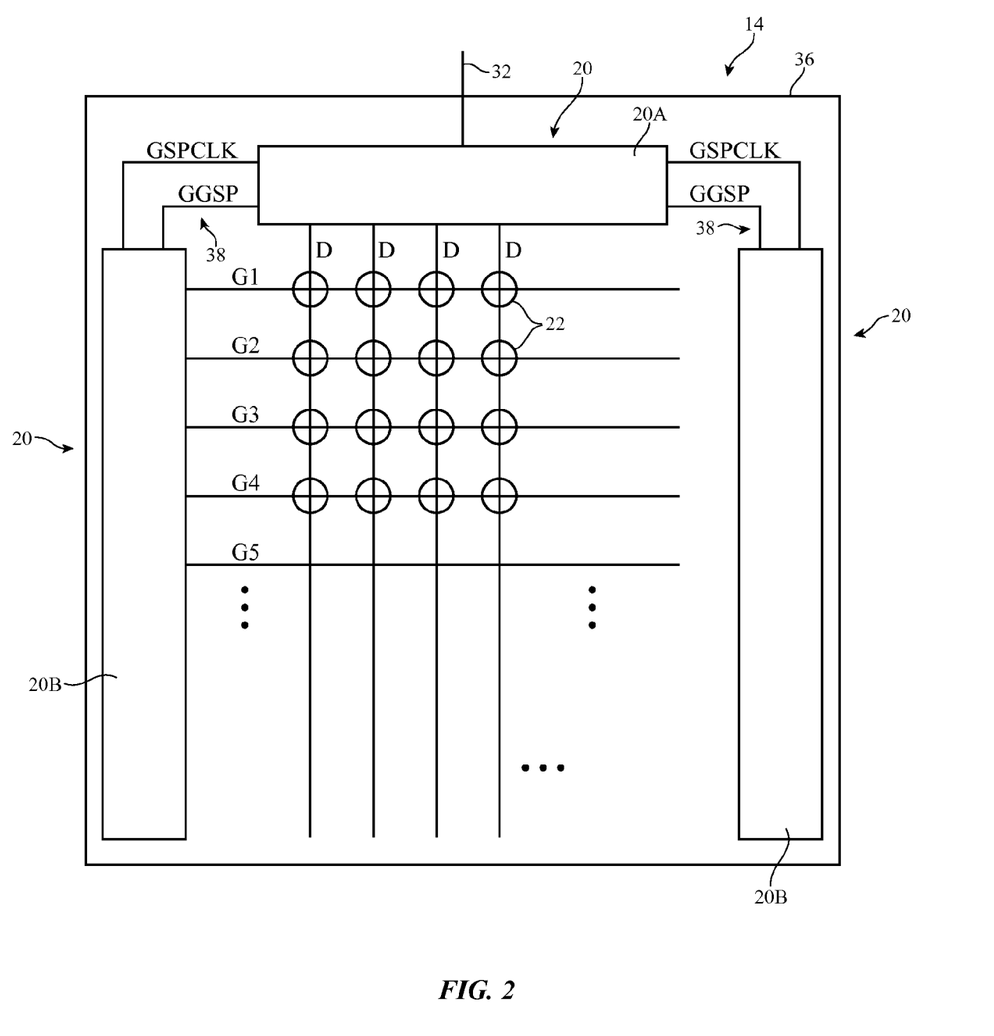
FIG. 2 is a top view of an illustrative display in an electronic device in accordance with an embodiment.

A top view of a portion of display 14 is shown in FIG. 2. As shown in FIG. 2, display 14 may have an array of pixels 22 formed on substrate 36. Substrate 36 may be formed from glass, metal, plastic, ceramic, or other substrate materials. Pixels 22 may receive data signals over signal paths such as data lines D and may receive one or more control signals over control signal paths such as horizontal control lines G (sometimes referred to as gate lines, scan lines, emission control lines, etc.). There may be any suitable number of rows and columns of pixels 22 in display 14 (e.g., tens or more, hundreds or more, or thousands or more). In organic light-emitting diode displays, pixels 22 contain respective light-emitting diodes and pixel circuits that control the application of current to the light-emitting diodes. In liquid crystal displays, pixels 22 contain pixel circuits that control the application of signals to pixel electrodes that are used for applying controlled amounts of electric field to pixel-sized portions of a liquid crystal layer.

Display driver circuitry 20 may be used to control the operation of pixels 22. Display driver circuitry 20 may be formed from integrated circuits, thin-film transistor circuits, or other suitable circuitry. Thin-film transistor circuitry may be formed from polysilicon thin-film transistors, semiconducting-oxide thin-film transistors such as indium gallium zinc oxide transistors, or thin-film transistors formed from other semiconductors. Pixels 22 may contain light-emitting diodes of different colors (e.g., red, green, and blue) to provide display 14 with the ability to display color images.

Display driver circuitry 20 may include display driver circuits such as display driver circuit 20A and gate driver circuitry 20B. Display driver circuit 20A may be formed from one or more integrated circuits and/or thin-film transistor circuitry. Gate driver circuitry 20B may be formed from integrated circuits or may be thin-film "gate-on-array" circuitry. Display driver circuit 20A of FIG. 2 may contain communications circuitry for communicating with system control circuitry such as control circuitry 16 of FIG. 1 over path 32. Path 32 may be formed from traces on a flexible printed circuit or other conductive lines. During operation, the control circuitry (e.g., control circuitry 16 of FIG. 1) may supply circuit 20A with information on images to be displayed on display 14.

To display the images on display pixels 22, display driver circuit 20A may supply image data to data lines D while issuing clock signals and other control signals such as signals gate start pulse clock signal GSPCLK and global gate start pulse GGSP to supporting display driver circuitry such as gate driver circuitry 20B over paths 38. Circuitry 20A may supply clock signals and other control signals to gate driver circuitry 20B on one or both edges of display 14.

Gate driver circuitry 20B (sometimes referred to as horizontal control line control circuitry) may control horizontal control lines (gate lines) G (e.g., G1, G2, G3 . . . ). In general, horizontal control lines G in display 14 may carry gate line signals (scan line signals), emission enable control signals, and other horizontal control signals for controlling the pixels of each row. There may be any suitable number of horizontal control signals per row of pixels 22 (e.g., one or more, two or more, three or more, four or more, etc.). In a liquid crystal display, as an example, frames of image data may be displayed by asserting a gate signal on each gate line G in the display in sequence. Shift register circuitry in gate driver circuitry 20B may be used in controlling the gate line signals. When it is desired to pause display driver circuitry 20 to accommodate acquisition of touch sensor signals, display driver circuitry 20 may implement an intraframe pause (IFP).

Figure 3:
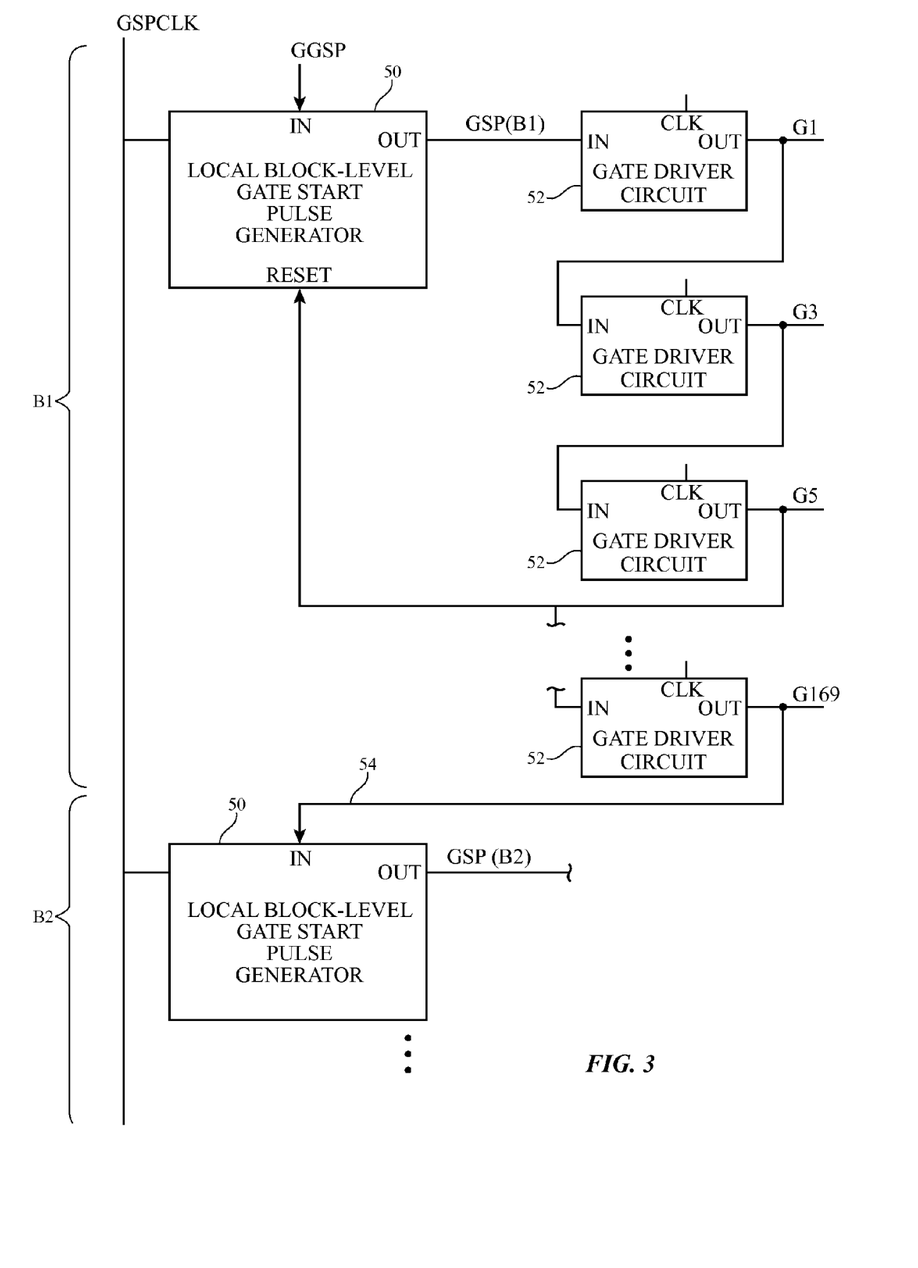
FIG. 3 is a circuit diagram of gate driver circuitry in accordance with an embodiment.

A circuit diagram of illustrative gate driver circuitry with intraframe pause capabilities is shown in FIG. 3. Gate driver circuitry 20B has blocks of gate driver circuitry such as left-edge blocks B1, B2, . . . BN each of which supplies gate line signals to a corresponding set of gate lines. There may be any suitable number of blocks of gate driver circuits in display 14 and each block may control the gate line signals for any suitable number of gate lines G. In the present example, display 14 has 2048 gate lines that are shared between twelve left-edge blocks and twelve right-edge blocks. The first 11 pairs of left/right blocks each handle outputs for 170 gate lines. The last left/right pair of blocks handles outputs for 178 gate line outputs. This configuration is merely illustrative. Any suitable number of blocks and gate lines may be used in display 14, if desired.

During operation, one gate line signal in display 14 is asserted at any given time. The location of the asserted gate line signal propagates downwards through gate lines G in sequence. When display 14 is paused for an intraframe pause operation, the propagation of the asserted gate line signal through the blocks stops at the end of the current block. Once the intraframe pause operation is complete, the propagation of the asserted gate signal resumes, starting from the beginning of the next block.

FIG. 3 shows circuitry for the first two left-edge blocks B1 and B2. As shown in FIG. 3, each block has a local block-level gate start pulse generator 50 and a set of associated gate driver circuits 52. Gate driver circuits 52 are chained together to form a shift register. The first gate driver circuit in the shift register is coupled to the generator 50 in the same block. The last gate driver circuit in the shift register is coupled to the generator 50 in the next block.

The output of local block-level gate start pulse generator 50 in first block B1 is used to generate a gate start pulse (called GSP(B1) in first block B1. This gate start pulse initiates operation of the shift register formed by the chain of gate driver circuits 52 in first block B1. The operation of gate driver circuits 52 is clocked using multiphase clock signals on clock inputs CLK. Local block-level gate start pulse generators 50 are clocked using global clock GSPCLK from display driver circuit 20A. Display driver circuit 20A can control GSPCLK to create pauses in the propagation of the gate line signal between the shift registers of successive blocks. These pauses are called intraframe pauses because they occur during the operation of displaying a frame of image data on the array of pixels in display 14.

When triggered, the output OUT of a gate driver circuit 52 will be asserted. For example, when the uppermost gate driver circuit 52 of FIG. 3 is triggered by receipt of gate start pulse GSP(B1) from local block-level gate start pulse generator 50, the gate line signal on gate line G1 will be asserted. The output OUT of each gate driver circuit 52 then serves as a triggering input signal at input IN for a subsequent gate driver circuit 52. For example, upon assertion of gate line G1, the next gate driver circuit 52 of block B1 will be triggered and that gate driver circuit will assert the gate line signal on gate line G3. This process ripples through the entire shift register until the last gate driver circuit 52 in block B1 has been triggered.

When the last gate driver circuit 52 in block B1 has been triggered, the gate line output of that gate driver circuit will be applied to the local block-level gate start pulse generator for the next block and will trigger that local block-level gate start pulse generator. In the example of FIG. 3, the output of the last gate driver circuit 52 on gate line G169 in block B1 serves as the triggering input on line 54 for the local block-level gate start pulse generator 50 in subsequent block B2. This causes the local block-level gate start pulse generator 50 in block B2 to generate gate start pulse GSP(B2), which is applied to the shift register formed from the chain of gate driver circuits 52 in block B2. All of the blocks in display 14 may be coupled together in this way, so that all of the gate lines in display 14 can be asserted in sequence during operation. Intraframe pausing can be accomplished by delaying global clock GSPCLK whenever a pause is desired. In the absence of a clock pulse from GSPCLK at the clock input to generator 50, no gate start pulse will be generated at the output of generator 50 (i.e., the production of the gate start pulse that is needed to initiate operation of the shift register will be paused). The amount by which clock GSPCLK is delayed will therefore determine the length of the pause.

Figure 4:
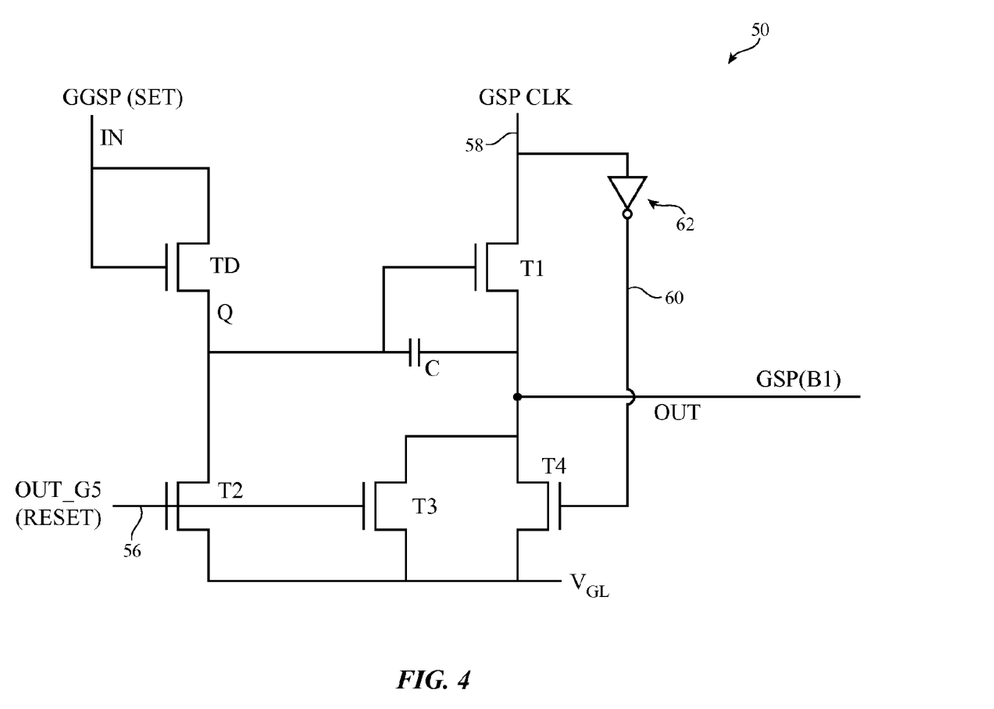
FIG. 4 is a circuit diagram of a local block-level gate start pulse generator in accordance with an embodiment.
Figure 6:
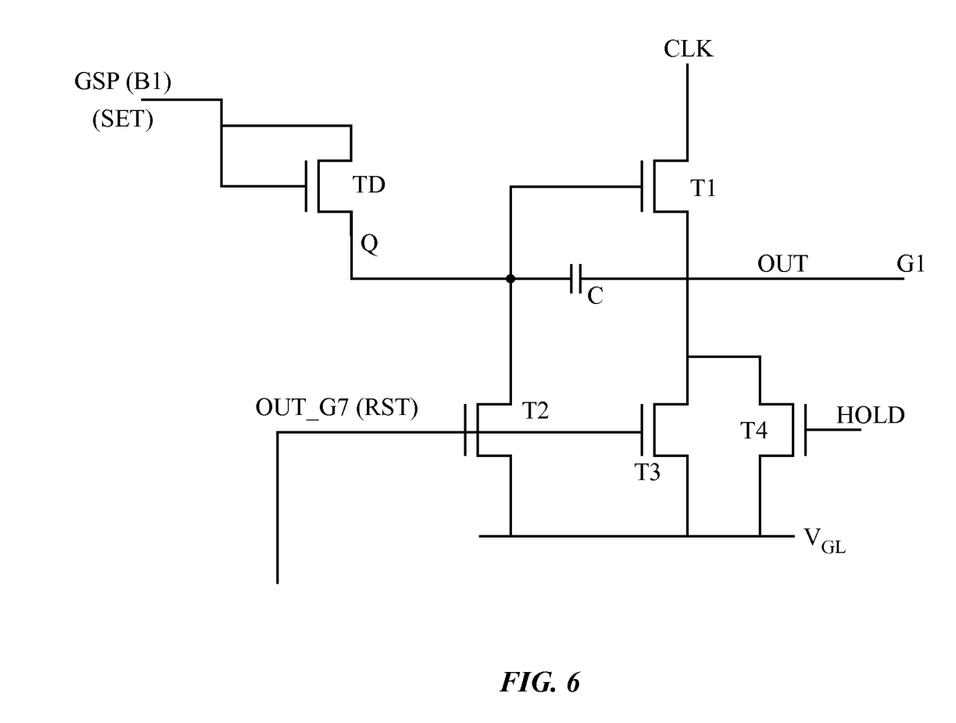
FIG. 6 is a circuit diagram of an illustrative gate driver circuit in accordance with an embodiment.

Local block-level gate start pulse generators 50 and gate driver circuits 52 may be based on register circuits of the type shown in FIGS. 4 and 6, respectively.

As shown in FIG. 4, circuit 50 may have a trigger input IN (sometimes referred to as the SET input for the register) and may have a corresponding output OUT at which a gate start pulse GSP is produced. The circuit of FIG. 4 corresponds to the local block-level gate start pulse generator for the first block (B1), so the triggering input signal applied to input IN is global gate start pulse GGSP. Signal GGSP serves as a SET signal for the register circuit of FIG. 4. The register can be reset at RESET input 56 using the output of a gate driver circuit that is located farther down in the shift register (e.g., the output OUT_G5 that is produced by the gate driver circuit that supplies signals to gate line G5 may be used as a reset signal for local block-level gate start pulse generator 50 in block B1).

As shown in FIG. 4, clock signal GSPCLK from display driver circuit 20A may be applied to clock input 58. Terminals IN and 58 can receive positive signals (e.g., 20 volt signals or other signals), whereas terminal $V_{GL}$ may be power supply terminal that receives lower voltages (e.g., voltages of −4 to −10 volts, etc.). Transistor T1 may have a gate coupled to data storage node Q. Transistors T2 and T3 may have gates coupled to reset input 56. Transistor T4 may have a gate coupled to line 60. Line 60 may receive an inverted version of the clock signal on line 58 via inverter 62.

Figure 5:
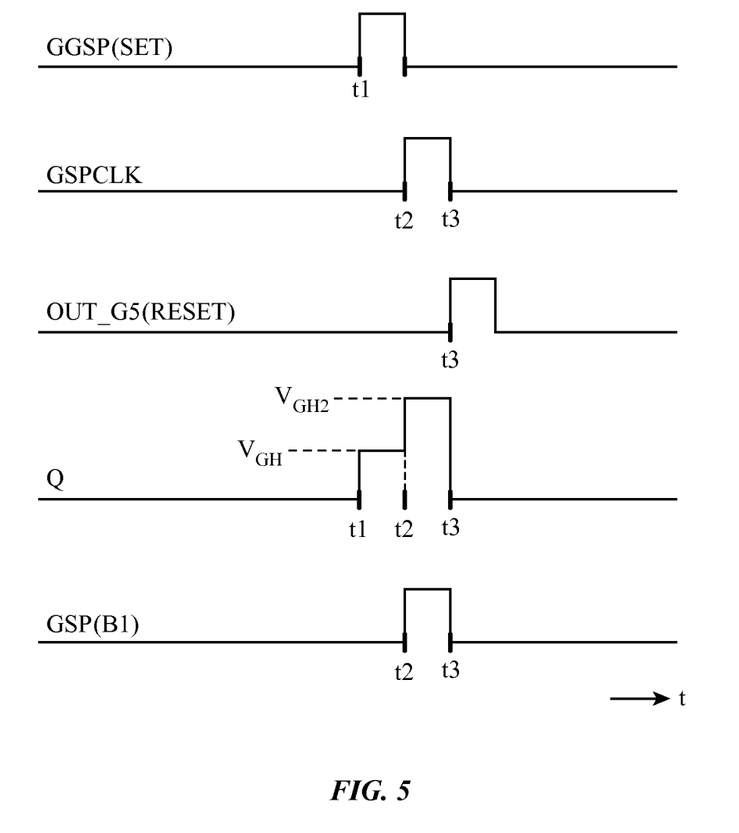
FIG. 5 is a timing diagram showing signals involved in operating the circuit of FIG. 4 in accordance with an embodiment.

Operation of circuit 50 in a scenario in which an output signal such as a gate start pulse GSP(B1) is being generated on output line OUT is illustrated in the timing diagram of FIG. 5. Clock signal GSPCLK of FIG. 5 may be applied to terminal 58 of circuit 50. Signal GGSP, which serves as a SET signal for circuit 50 in block B1 is supplied by display driver circuit 20A over path 38 (in subsequent blocks, the SET signal is received from the last gate driver circuit 52 in the preceding block). Diode-connected transistor TD allows signals with low-high transitions such as the leading edge of signal GGSP at time t1 to pass to node Q. Transistor TD will then allow the high signal on node Q that is produced by the high GGSP signal to float. At time t2, clock signal GSPCLK goes high. There are parasitic capacitances between the gate of transistor T1 and its source and drain. Through capacitive coupling, the rising clock signal GSPCLK at time t2 causes Q to rise from voltage $V_{GH}$ to $V_{GH2}$. As an example, Q may rise from about 20 volts to about 35 volts (or other suitable voltage). This process is sometimes referred to as bootstrapping. The bootstrapped voltage (35 volts in this example) that is supplied to the gate of transistor T1 will fully turn on transistor T1 and will allow the 20 volts clock signal on terminal 58 to pass to output OUT (as gate start pulse GSP(B1) in the present example). When GSPCLK goes low at t3, the gate of T4 is taken high, which turns on T4 and pulls output OUT low. At a time after t3, the output of one of gate drivers 52 (e.g., the output OUT_G5 of the gate driver that is associated with driving signals onto gate line G5 or other suitable output) may be asserted as a RESET signal at input 56. This may turn transistors T2 and T3 on to reset node Q and to help pull OUT low. As this example demonstrates, the GGSP signal precharges node Q to an intermediate voltage and the GSPCLK signal bootstraps output OUT to a final desired voltage. The RESET signal is used to clear bootstrap capacitor C.

FIG. 6 is a circuit diagram of an illustrative gate driver circuit 52. Gate driver circuit 52 operates in the same way as circuit 50 of FIG. 4. In the example of FIG. 6, gate driver circuit 52 is the first gate driver circuit 52 in a block (i.e., the first block B1), so the SET signal received at input IN corresponds to gate start pulse GSP(B1) and the output signal on OUT is the first gate line signal G1. Transistor T4 is controlled by a HOLD signal that is generated by a HOLD generating circuit in gate driver circuitry 20B. Signal HOLD is asserted when OUT is deasserted to pull out to $V_{GL}$ rather than letting OUT float. The reset signal RST for circuit 52 of FIG. 6 is provided by the output of a gate driver circuit that is located at a higher row in the shift register such as the gate driver circuit that produces gate line signal G7.

Figure 7:
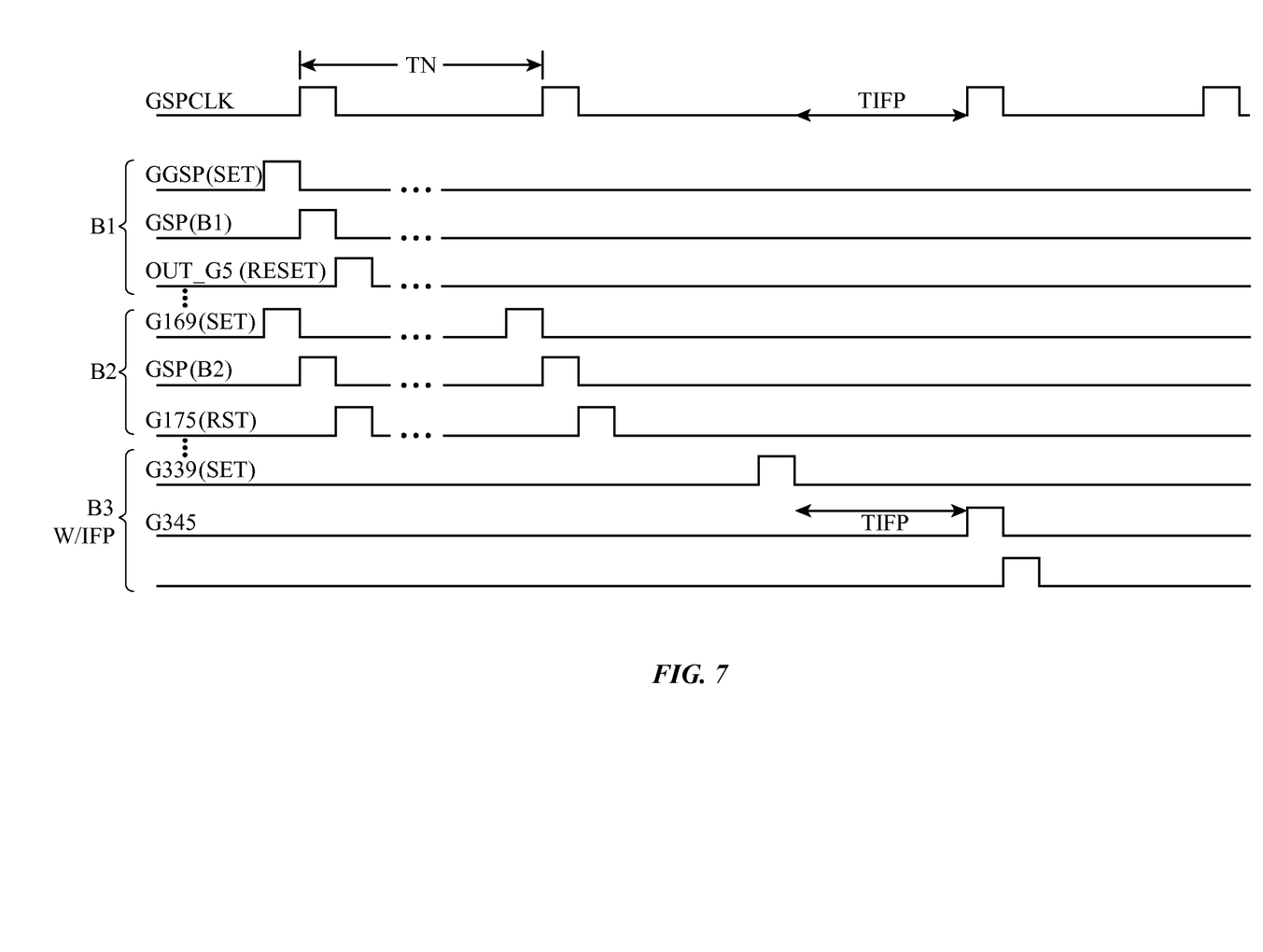
FIG. 7 is a timing diagram showing signals involved in operating the gate driver circuitry of FIG. 3 in accordance with an embodiment.

FIG. 7 is a timing diagram showing how intraframe pausing operations may be performed using the circuitry of FIG. 3. As shown in FIG. 7, global gate start pulse clock GSPCLK has a normal period TN and is used in initiating the generation of local gate start pulses from generators 50 at regular intervals. This ensures that the asserted gate line signal propagates smoothly through each of the blocks one after another.

When it is desired to introduce a pause, an extra amount of time is inserted between GSPCLK pulses. This delays the production of the gate start pulse in the affected block. In the example of FIG. 7, extra pause period TIFP is inserted into the GSPCLK, delaying the position of pulse 80 and thereby delaying the generation of the GSP(B3) signal in block B3 by TIFP. The location of delay TIFP and delayed pulse 80 determines the identity of the block in which the gate start pulse is delayed. The delaying of the gate start pulse in block B3 is merely illustrative.

When performing an intraframe pause using the technique shown in FIG. 7, node Q in the paused local block-level gate start pulse generator 50 retains a loaded voltage for the period of the pause (i.e., TIFP). This loaded voltage may stress transistor T1 in local block-level gate start pulse generator 50 of the paused block. Over time, this may cause variations in the performance of transistor T1. However, the output of this transistor is not coupled directly to a gate line, but rather provides a SET signal to a gate driver circuit 52. Because the output of this transistor is used to generate a gate start pulse that is applied to the input of a gate driver circuit 52 in the interior of gate driver circuitry 20B rather than being used to generate a gate line signal that is applied to pixels 22 in display 14, any stress-induced voltage fluctuations on the transistor output that are due to stress-induced changes in transistor performance will have negligible impact on display performance.

The foregoing is merely illustrative and various modifications can be made by those skilled in the art without departing from the scope and spirit of the described embodiments. The foregoing embodiments may be implemented individually or in any combination.

What is claimed is:

1. A touch-sensitive display, comprising:
an array of pixels; and
display driver circuitry having a display driver circuit that provides data signals to columns of the pixels and having gate driver circuitry that provides gate line signals to rows of the pixels, wherein the gate driver circuitry includes a plurality of blocks of gate driver circuits, wherein each of the blocks includes an associated gate start pulse generator, wherein each gate start pulse generator is coupled to the array of pixels only via the block in which that gate start pulse generator is included, wherein a given gate start pulse generator in one of the blocks is configured to store a loaded voltage during an intraframe pause period in a given frame, and wherein, between supplying a gate start pulse clock to a first one of the plurality of blocks and a second one of the plurality of blocks during the given frame, the display driver circuit is configured to delay supplying the gate start pulse clock to the second one of the plurality of blocks to introduce the intraframe pause period.

2. The display defined in claim 1 wherein the gate driver circuits in each block are coupled in a chain to form a shift register for that block.

3. The display defined in claim 2 further comprising gate lines with which the gate line signals are provided respectively to each of the rows of the pixels.

4. The display defined in claim 3 wherein each gate driver circuit has an output coupled to a respective one of the gate lines.

5. The display defined in claim 4 wherein each block has a first gate driver circuit in the shift register for that block and has a last gate driver in the shift register for that block and wherein the first gate driver circuit is coupled to the gate start pulse generator of that block.

6. The display defined in claim 5 wherein the gate start pulse generator of each block has an output that supplies a gate start pulse to the first gate driver circuit in the shift register for that block.

7. The display defined in claim 6 wherein the gate start pulse clock is supplied to each of the blocks.

8. The display defined in claim 7 further comprising a signal path that distributes the gate start pulse clock to a clock input of each of the gate start pulse generators.

9. The display defined in claim 8 wherein each of the gate start pulse generators has a reset input.

10. The display defined in claim 9 wherein at least one of the gate start pulse generators receives an output from one of the gate driver circuits at the reset input for that gate start pulse generator.

11. The display defined in claim 10 wherein each of the gate start pulse generators has a set input.

12. The display defined in claim 11 wherein the blocks include at least first and second blocks, wherein a first of the gate start pulse generators is in the first one of the plurality of blocks and receives a signal from the display driver circuit at the set input for the first of the gate start pulse generators, and wherein a second of the gate start pulse generators is in the second one of the plurality of blocks and receives a signal at its set input from the output of the last gate driver circuit in the first one of the plurality of blocks.

13. The display defined in claim 12 wherein the gate start pulse generators each have a bootstrapping capacitor.

14. The display defined in claim 13 wherein the gate driver circuits each have a bootstrapping capacitor.

15. A touch-sensitive display, comprising:
a substrate;
thin-film transistor circuitry on the substrate;
an array of pixels on the substrate that are at least partly formed from the thin-film transistor circuitry; and
display driver circuitry having a display driver circuit that provides data signals to columns of the pixels and having gate driver circuitry that is at least partly formed from the thin-film transistor circuitry and that provides gate line signals to rows of the pixels, wherein the gate driver circuitry includes a plurality of blocks of gate driver circuits, wherein each block includes a pulse generator that supplies a gate start pulse to that block, wherein, between supplying a gate start pulse clock signal to a first one of the plurality of blocks and a second one of the plurality of blocks during a given frame, the display driver circuit is configured to delay supplying the gate start pulse clock signal to the second one of the plurality of blocks that is supplied to each of the pulse generators to introduce an intraframe pause in the given frame, and wherein the gate driver circuitry generates the gate signals for the given frame before and after the intraframe pause.

16. The display defined in claim 15 wherein each gate driver circuit has an output at which a respective one of the gate line signals is provided.

17. Gate driver circuitry for a touch-sensitive display having a display driver circuit and that has an array of pixels receiving data over data lines and gate line signals over gate lines, the gate driver circuitry comprising:
a plurality of blocks of gate driver circuits, wherein the gate driver circuits of each block are coupled in a chain to form a shift register having a first gate driver circuit and a last gate driver circuit and wherein each gate driver circuit supplies a respective one of the gate line signals to a respective one of the gate lines; and
a local block-level gate start pulse generator in each block that supplies a gate start pulse to the first of the gate driver circuits in that block, wherein, between supplying a gate start pulse clock to a first one of the plurality of blocks and a second one of the plurality of blocks during a given frame, the display driver circuit is configured to delay supplying the gate start pulse clock to the second one of the plurality of blocks to introduce an intraframe pause in the given frame.

18. The gate driver circuitry defined in claim 17 wherein the local block-level gate start pulse generator of each block has a reset input that receives an output from one of the gate driver circuits.

19. A touch-sensitive display, comprising:
an array of pixels;
a display driver circuit coupled to the array of pixels; and
gate driver circuitry that is coupled to the array of pixels array and that includes first and second start pulse generators respectively coupled to first and second blocks of gate driver circuits in the gate driver circuitry, wherein, between supplying a clock signal to the first and second blocks of gate driver circuits during a given frame, the display driver circuit is configured to delay the clock signal supplied to the gate driver circuitry second block of gate driver circuits to implement an intraframe pause that pauses display operations for the given frame, wherein the start pulse generator includes a storage structure that retains data during the intraframe pause, and wherein the start pulse generator is configured to provide a gate start pulse to the block of gate driver circuits to resume display operations for the current frame.

20. The display defined in claim 19, further comprising: touch sensing circuitry that is activated during the intraframe pause.

21. The display defined in claim 19, wherein the gate driver circuitry further includes an additional block of gate driver circuits, wherein the start pulse generator is coupled between the block and the additional block of gate driver circuits, wherein the start pulse generator receives an output from the additional block, and wherein the start pulse generator is configured to resume the display operations for the current frame based on the clock signal and the output from the additional block.

* * * * *